July 30, 1968

P. S. FLETCHER 3,394,965

SEQUENCING ARRANGEMENT FOR RECLINING CHAIR
OF THE MULTIPLE MOVEMENT TYPE

Filed Nov. 6, 1963

INVENTOR
PETER S. FLETCHER

BY Ameter + Levy
ATTORNEYS

INVENTOR
PETER S. FLETCHER
BY Amster + Levy
ATTORNEYS

July 30, 1968  P. S. FLETCHER  3,394,965
SEQUENCING ARRANGEMENT FOR RECLINING CHAIR
OF THE MULTIPLE MOVEMENT TYPE Filed Nov. 6, 1963  6 Sheets-Sheet 4

INVENTOR.
PETER S. FLETCHER

BY
Amster & Levy
ATTORNEYS

July 30, 1968 P. S. FLETCHER 3,394,965
SEQUENCING ARRANGEMENT FOR RECLINING CHAIR
OF THE MULTIPLE MOVEMENT TYPE
Filed Nov. 6, 1963 6 Sheets-Sheet 5
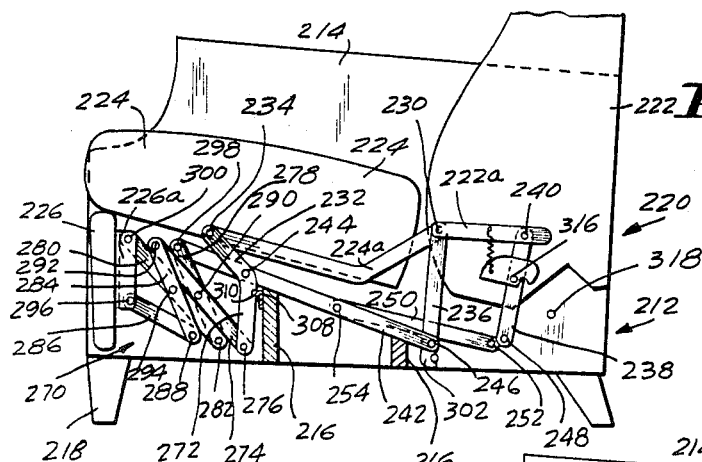
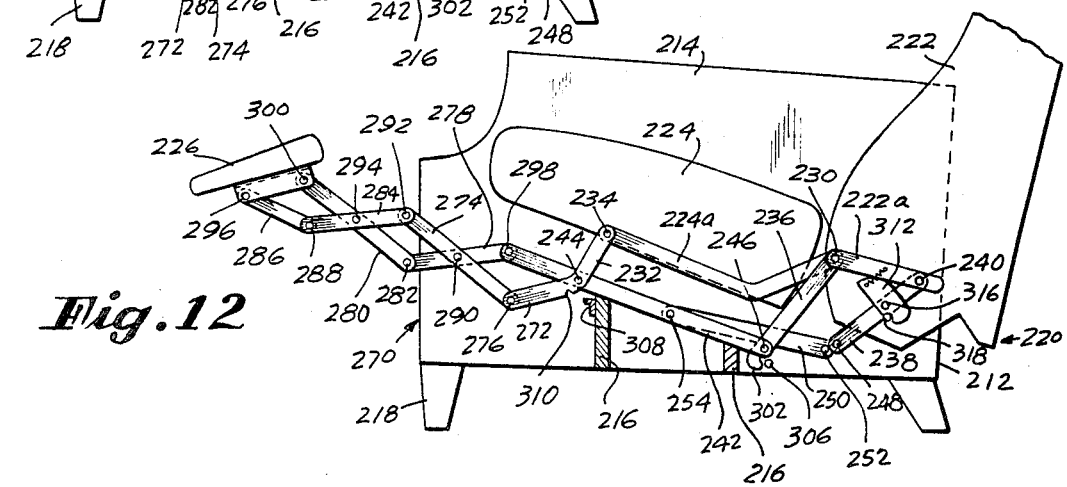
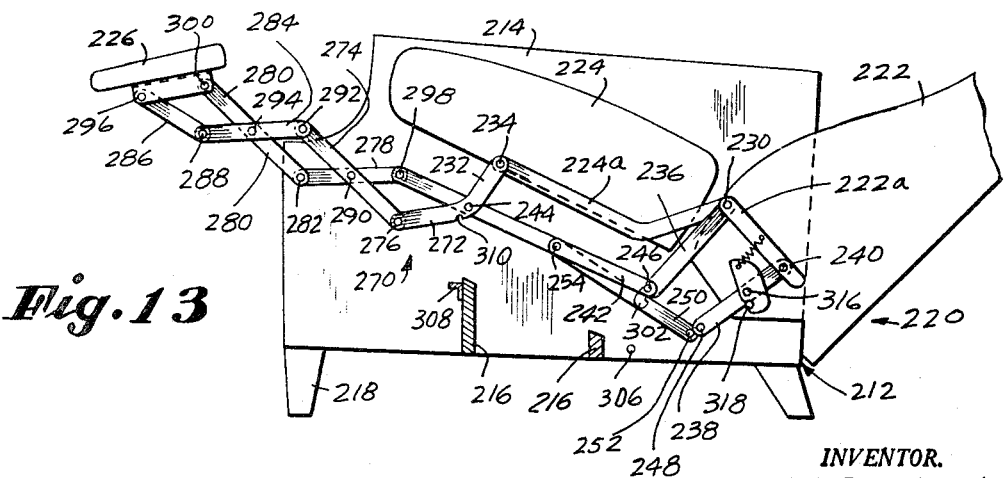
INVENTOR.
PETER S. FLETCHER
BY
Amster + Levy
ATTORNEYS

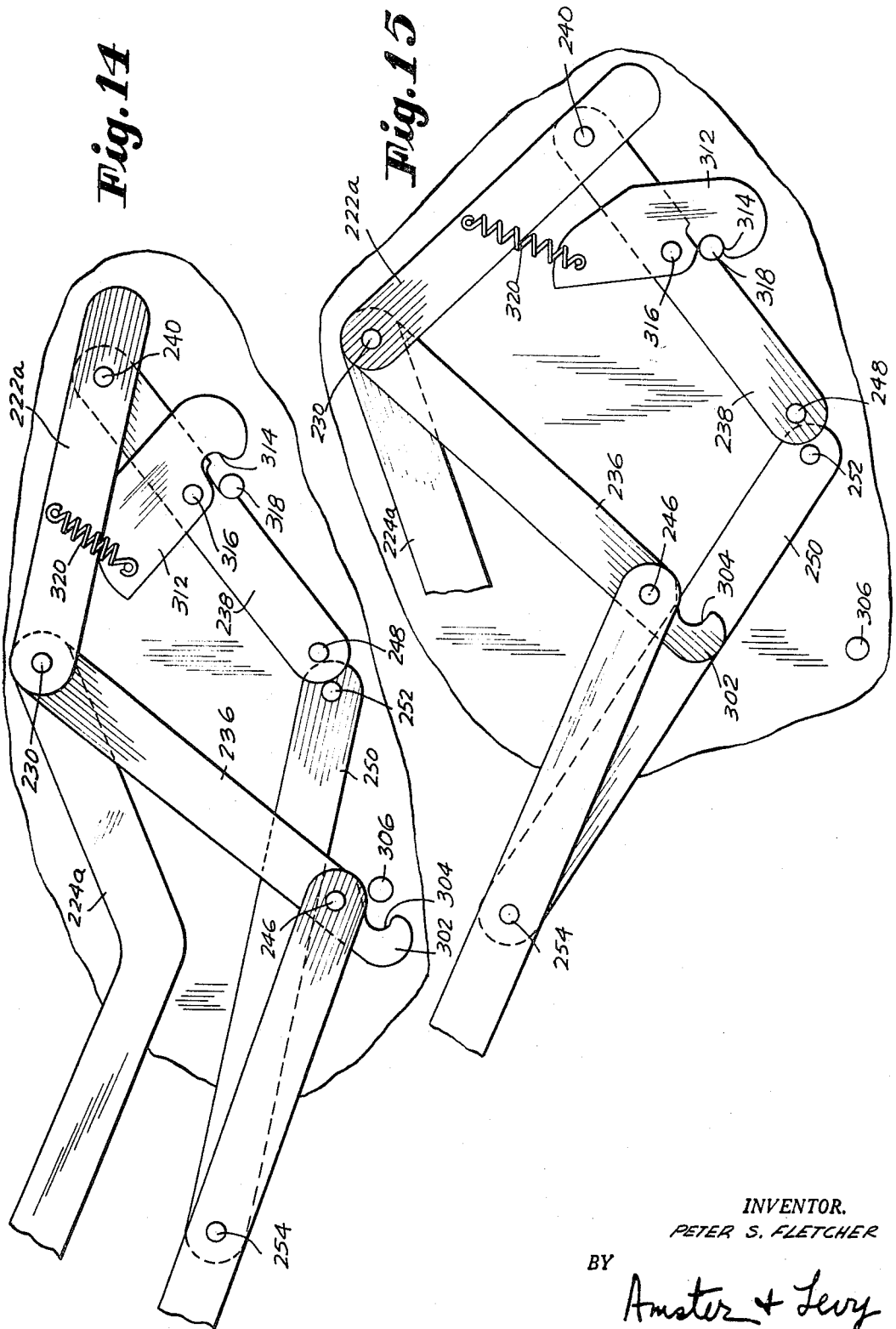

_United States Patent Office_      3,394,965
Patented July 30, 1968

---

3,394,965
SEQUENCING ARRANGEMENT FOR RECLINING
CHAIR OF THE MULTIPLE MOVEMENT TYPE
Peter S. Fletcher, 200 NW. 15th St.,
Delray Beach, Fla. 33444
Continuation-in-part of application Ser. No. 11,339,
Feb. 26, 1960. This application Nov. 6, 1963, Ser.
No. 322,568
9 Claims. (Cl. 297—321)

The present invention relates to reclining chairs of the type including body-supporting means mounted to have at least two distinct phases of chair movement, and in particular to a sequencing arrangement for a reclining chair of this type to establish the order of operation of the several phases. This is a continuation-in-part of my earlier filed application Ser. No. 11,339 filed on Feb. 26, 1960 and entitled Sequencing Arrangement for Reclining Chair of the Multiple Movement Type.

Heretofore there have been two distinct types of single movement reclining chairs, those constructed with a unitary back-rest and seat mounted on the support for movement into various tilted positions, and those constructed with a movable back-rest and movable seat mounted on the support for reclining and inclining movement respectively. Chairs of the single movement type incorporating a unitary back-rest and seat are most suitable for accommodating the chair occupant in a tilted back position, but in a sitting attitude with the occupant's legs supported on the elevated leg-rest. Such chairs are particularly suitable for accommodating the chair occupant in an attitude appropriate for television viewing, reading, sewing and like activities. Chairs of the type incorporating a movable back-rest and movable seat are found to be more suitable for accommodating the chair occupant in a complete and full relaxation position in that the angle between the seat and back-rest increases in response to the reclining movement of the chair. Such chairs are particularly suitable for accommodating the chair occupant in a stretched out or fully reclined attitude.

Of recent times there have been developed improved multiple movement reclining chairs which exhibit attributes of both types of chairs which have been heretofore sold, to wit those suitable for accommodating the chair occupant in a tilted back attitude, and those which will accommodate the chair occupant in a fully reclined or completely relaxed attitude. The multiple movement chairs may be of the type incorporating a unitary back-rest and seat wherein there are first and second movement phases, with the chair moving from an upright sitting position to an intermediate tilted sitting position during the first movement phase and from the intermediate tilted sitting position to a reclining position in the second movement phase, with no change in the angular relationship between the seat and back-rest during such two movement phases; or of the type incorporating a movable seat and movable back-rest wherein there are first and second movement phases, with the chair moving from an upright sitting position to an intermediate, tilted sitting position during the first movement phase and from the intermediate, tilted sitting position to a reclining position in the second movement phase, with an increase in the angular relationship between the seat and back-rest during the second movement phase. Both of these types of chairs usually include first and second guide means which movably mount the body-supporting means on the support for the first movement phase from an upright sitting position to an intermediate tilted sitting position and for a second movement phase from the intermediate, tilted sitting position to a reclining position. Such first and second guide means are subject to a great deal of variation and change on their construction, but the problem exists to establish the order or sequence of operation of such guide means to assure that the body-supporting means will be properly guided during the first and second movement phases respectively to establish the several positions for the chair. Such sequencing should be of a positive and reliable nature and preferably should be automatically operable when the chair occupant is seated and exerts the necessary actuating force upon the body-supporting means of the chair. Further, the sequencing should be established in a manner compatible with the more generalized requirements of simplicity in construction and facility to mass production manufacture.

Broadly, it is an object of the present invention to provide a sequencing arrangement for a reclining chair of the type including at least two distinct phases of chair movement. Specifically, it is within the contemplation of the present invention to provide a constraining means useful in reclining chairs of the multiple movement type which is effective to establish the sequence of operations for the chair automatically as the chair is operated by the chair occupant. More particularly, the invention contemplates the provision of hooks, catches, locks and the like, which are preferably automatically operated to lock and hold links inoperative in one phase or the other of a multiple movement chair.

In accordance with an illustrative embodiment demonstrating objects and features of the present invention, there is provided in a reclining chair of the multiple movement type, including a support and body-supporting means including a seat and back-rest mounted on the support by first and second movement linkages operated in the order named to establish first and second movement phases for the chair, a blocking means which engages the second movement linkages and blocks the same against movement at the start of the first movement phase, and means operable during the first movement phase for moving the blocking means out of engagement with the second movement linkage.

As a feature of the invention, the movement of the blocking means out of engagement with the second movement linkage is delayed such that the same occurs when the chair is out of the upright sitting position and already moving through the first movement phase.

As a still further feature of the invention, a further blocking means may be mounted on a link of the first movement linkage and arranged to engage and lock the first movement linkage to the support at the end of the first movement phase, such that the movement of the first movement linkage is blocked during the second movement phase.

The above brief description, as well as further objects, features and advantages of the present invention, will be more fully understood by reference to the following detailed description of several illustrative embodiments according to the present invention, when taken in conjunction with the accompanying drawings, wherein:

FIG. 11 is a side elevational view, with parts broken away and sectioned, showing a further embodiment of reclining chair of the double movement type embodying a sequencing arrangement in accordance with the present invention, with the chair shown in the upright sitting position;

FIG. 12 is a side elevational view similar to FIG. 11 but showing the further embodiment of reclining chair in an intermediate, tilted sitting position, with the leg-rest moved to an elevated leg-supporting position, and the sequencing arrangement in its corresponding intermediate position;

FIG. 13 is a side elevational view similar to FIG. 12, but showing the further embodiment of reclining chair in a fully reclined position, with the leg-rest being disposed in an elevated leg-supporting position, and the sequencing arrangement shown in its corresponding end position;

FIG. 14 is an enlarged fragmentary side elevational view, corresponding to the complete showing of FIG. 11, with parts broken away for clarity, showing the sequencing arrangement and its relationship to the chair linkage in the upright sitting position;

FIG. 15 is a view similar to FIG. 14, showing the sequencing arrangement and the chair linkage in the intermediate, tilted sitting position corresponding to the complete showing of FIG. 12.

Figure 1:
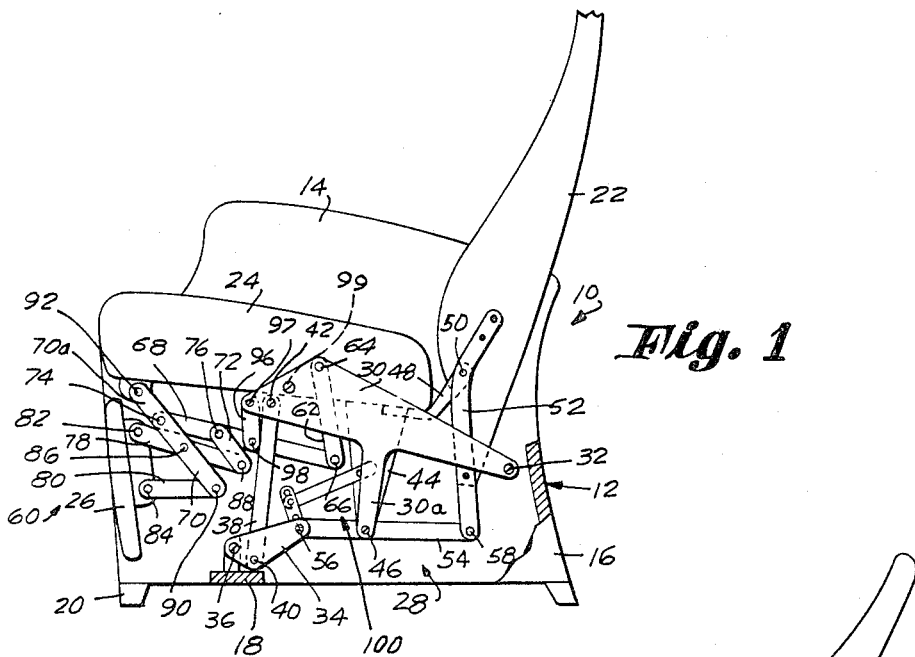
FIG. 1 is a side elevational view, with parts broken away and sectioned, showing a reclining chair of the double movement type embodying a sequencing arrangement in accordance with the present invention, with the chair shown in the upright sitting position.
Figure 2:
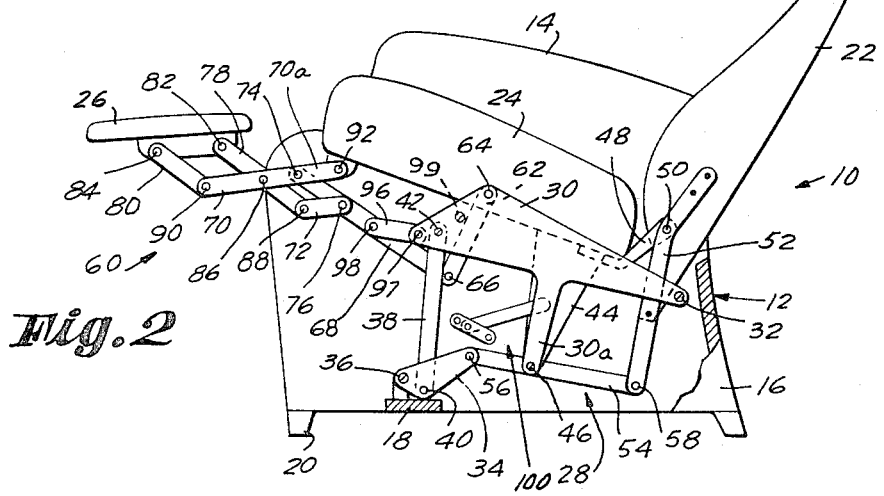
FIG. 2 is a side elevational view similar to FIG. 1 but showing the chair in an intermediate, tilted sitting position, with the leg-rest moved to an elevated leg-supporting position, and the sequencing arrangement in its corresponding intermediate position.
Figure 3:
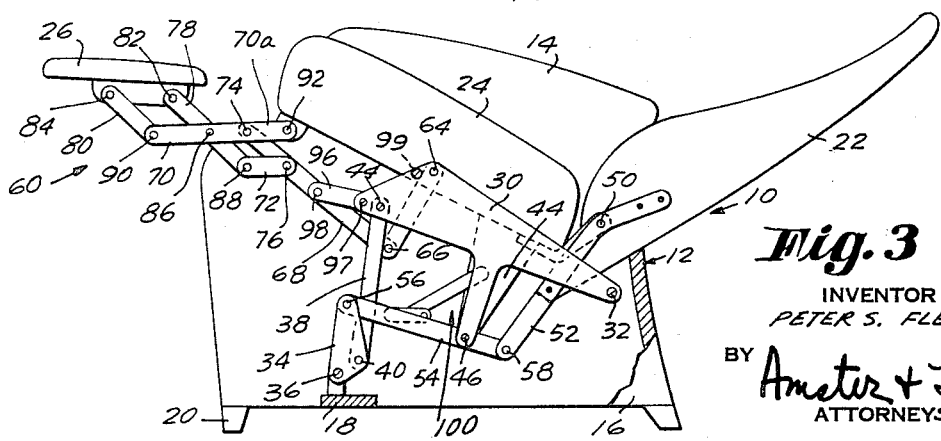
FIG. 3 is a side elevational view similar to FIG. 2, but showing the reclining chair in a fully reclined position, with the leg-rest being disposed in an elevated leg-supporting position, and the sequencing arrangement shown in its corresponding end position.

Referring now specifically to FIGS. 1 to 3 of the drawings, there is shown a first illustrative reclining chair, generally designated by the reference numeral 10, which includes a support or frame 12 having opposite side walls 14, 16 interconnected by suitable cross braces 18 and supported on depending legs 20.

Body-supporting means including a back-rest 22 and a seat 24 are movably mounted on the support 12 for inclining and reclining movement respectively for a first movement phase from the upright sitting position illustrated in FIG. 1 to the intermediate, tilted sitting position illustrated in FIG. 2 and for a second movement phase from the intermediate tilted position illustrated in FIG. 2 through a series of reclining positions to a fully reclined or complete relaxation position illustrated in FIG. 3.

Disposed beneath the forward end of the seat 24 is a leg-rest 26 which is mounted for movement from a stored or retracted position, as shown in FIG. 1, to a first elevated leg-supporting position as shown in FIG. 2 and to a further elevated leg-supporting position as shown in FIG. 3. As will be described, the leg-rest is coordinated to the back-rest 22 and the seat 24 for movement into the elevated leg-supporting position in response to the first movement phase of the chair, with the leg-rest 26 remaining substantially in the elevated leg-supporting position as the chair moves from the intermediate, tilted sitting position of FIG. 2 to the fully reclined position of FIG. 3.

A mounting arrangement, generally designated by the reference numeral 28, is provided for guiding the back-rest 22 and seat 24 during the first and second movement phases. The mounting arrangement includes a first linkage for guiding the body-supporting means from the upright sitting position to the tilted sitting position and a second linkage for guiding the body-supporting means from the tilted sitting position to the reclining position. Since the linkage which is operative during the first movement phase is built onto the second linkage in the mounting arrangement 28, it will facilitate the understanding of the invention if the second linkage is described first.

Specifically the second linkage includes a carrier link 30 which is pivotally mounted on the support 12, the carrier link 30 remaining stationary during the first movement phase, as may be appreciated by progressively inspecting FIGS. 1 and 2, and moving during the second movement phase, as may be appreciated by progressively inspecting FIGS. 2 and 3. The carrier link 30 is pivotally mounted on the support 12 at a carrier pivotal mount 32 adjacent the rearward end of the carrier link 30 and contiguous to the rearward end of the chair frame or support 12. At its front end, the carrier link 30 is connected to the support by a mounting link pair including a mounting link or plate 34 having a stationary pivotal mount 36 on the support at the cross brace 18 and a connecting link 38 having a pivotal connection 40 at its lower end to the mounting plate or link 34 at a point spaced from the pivotal mount 36 and a pivotal connection 42 to the carrier link 30 at a point spaced from the carrier pivotal mount 32. As seen in FIG. 1, the mounting plate or link 34 rests upon the cross brace 18 serving as a stop for maintaining the carrier link 30 in a prescribed attitude in relation to the support. It will be appreciated, however, that the mounting plate 34 may turn in the counterclockwise direction about the pivotal mount 36 during the second movement phase and in response to the actuation of the second guiding linkage to cause the carrier link 30 to turn in the clockwise direction about its rear pivotal mount 32 on the support, as may be appreciated by progressively inspecting FIGS. 2 and 3.

Built onto the second linkage and operatively connected thereto is the first linkage which uses the carrier link 30 as a stationary supporting structure thereof. Specifically, the seat 24 carries a depending rigid mounting plate 44 which has a pivotal mount 46 at its lower end on a depending extension 30a of the carrier link such that the seat may turn about the pivotal mount 46 as the relatively stationary pivot thereof during the first movement phase. Furthr, the seat carries a rearwardly directed hanger arm 48 upon which the back-rest 22 is mounted on a back-rest pivot 50.

Provision is made for coupling the back-rest 22 which is mounted on the seat 24 to one of the movable links of the second movement phase linkage. Specifically, a depending bracket 52 is secured to the lower end of the back-rest 22 which bracket 52 is coupled to the mounting plate or link 34 by a back-rest link 54 which has a pivotal connection 56 at its forward end to the link 34 at a point spaced from the pivotal mount 36 and a pivotal connection 58 at its rearward end to the lower end of the depending barcket 52.

In this illustrative embodiment, the leg-rest 26 is mounted for movement into the several elevated leg-supporting positions by a leg-rest mounting linkage, generally designated by the reference numeral 60 which is of the type discolsed and described in my copending application, Ser. No. 771,991, filed Nov. 5, 1958 and entitled "Adjustable Reclining Chair With Coordinated Leg-Rest Control Means." Specifically, the leg-rest mounting linkage 60 includes a guiding link 62 which has a pivotal connection 64 at its upper end to the carrier link 30 and a pivotal connection 66 at its lower end to a control link 68 which extends forwardly toward the leg-rest 26. A pair of depending links 70, 72 are pivotally mounted at spaced pivotal connections 74, 76 on the front end of the control link 68, with the link 70 having an upwardly directed integral projection 70a. The leg-rest linkage further includes a further pair of links 78, 80 having respective pivotal connections 82, 84 at their forward ends to the leg-rest at spaced points thereof. The link 78 crosses behind the link 70 and has a pivotal connection 86 at the cross-over point. Further, the link 78 has a pivotal connection 88 at its rearward end to the link 72, while the link 80 has a pivotal connection 90 at its rearward end to the lower end of the link 70. The upstanding extension 70a of the link 70 which projects upwardly above the pivotal connection 74 serves as an actuating means and has a pivotal connection 92 to the seat 24, which pivotal connection 92 along with the pivotal connection 64 moves rearwardly in response to the pivotal movement of the seat 24 about the seat pivot 46. The leg-rest mounting linkage 60 is completed by a guiding link 96 which has a pivotal mount 97 on the front end of the carrier link 30 and a pivotal connection 98 to the control link 68 intermediate the ends thereof. The pivotally interconnected links will be recognized as providing a lazy tong type of mounting linkage which is effective to extend and elevate the leg-rest 26 in response to movement of the seat 24 about the seat pivot 46. A stop 99 is mounted on the carrier link in position to abut the actuating or guiding link 62 after the latter has turned through a prescribed arc about the pivotal connection 64 whereupon the leg-rest mounting linkage 60 is effectively made rigid with the carrier link 30 for the second movement phase. Finally, as seen in FIG. 3, the rear cross brace 18 of the chair frame is adapted to abut the lower end of the back-rest 22 to establish the fully reclined position for the chair.

For a better understanding of this illustrative chair, reference will be made to a typical sequence of operations:

When the chair occupant is seated in the chair and presses rearwardly in the body-supporting unit, the seat 24 and the back-rest 22 turn about the seat pivot 46 on the carrier link 30. The back-rest 22 is guided by the back-rest link 54, with the pivotal connection 56 on the mounting plate or link 34 serving as a relatively stationary pivot for guiding the back-rest 22 during the first movement phase. By the selection of the location of the pivotal connection in relation to the location of the seat pivot 46, it is possible to arrange for substantially no relative movement between the back-rest 22 and the seat 24 during the first movement phase or, if desired, to obtain some compensating movement between the back-rest 22 and seat 24 if desired. If, for example, the pivots 46, 56 were made coaxially with each other, there would be no relative movement between the back-rest and seat during the first movement phase. In the position selected for the pivot 56 in relation to the pivot 46, there is substantially no angular change between the back-rest 22 and seat 24, as may be appreciated by progressively inspecting FIGS. 1 and 2.

During the inclining movement of the seat 24, an upwardly directed actuating force is imparted to the leg-rest mounting linkage 60 via the pivotal connection 92 which tends to move the leg-rest 26 to the extended and elevated leg-supporting position as shown in FIG. 2, with the movement of the leg-rest linkage 60 being blocked incident to contact of the guiding link 62 with the stop 99.

During the second movement phase, the seat 24 and the leg-rest mounting linkage 60 becomes a unitary assembly with the carrier link 30 for all intents and purposes. However, the back-rest is capable of turning about the back-rest pivot 50 on the hanger arm 48. Specifically, as the chair occupant places weight against the back-rest 22 to move rearwardly, pivoting about the back-rest pivot 50 and the back-rest imparts a forwardly directed thrust via the link 54 to the link pair 34, 36 of the second movement linkage which tends to turn the link 34 in the counterclockwise direction about the pivotal mount 36. The second movement phase continues until such time as the back-rest 22 is blocked against further rearward movement, which occurs in this illustrative embodiment when the back-rest 22 abuts the rear cross brace of the chair frame or support. During the second movement phase, the blocked leg-rest mounting linkage 60 maintains the leg-rest 26 and seat 24 in the same relative position, although the general level of the leg-rest and seat is displaced upwardly incident to the movement of the second movement phase linkage. When the chair occupant desires to restore the chair to the upright sitting position, the occupant leans forwardly such that the back-rest, seat and leg-rest move through the reverse sequence of operations, with the chair first moving into the intermediate tilted sitting position of FIG. 2 and then being returned to the upright sitting position of FIG. 1.

Figure 4:
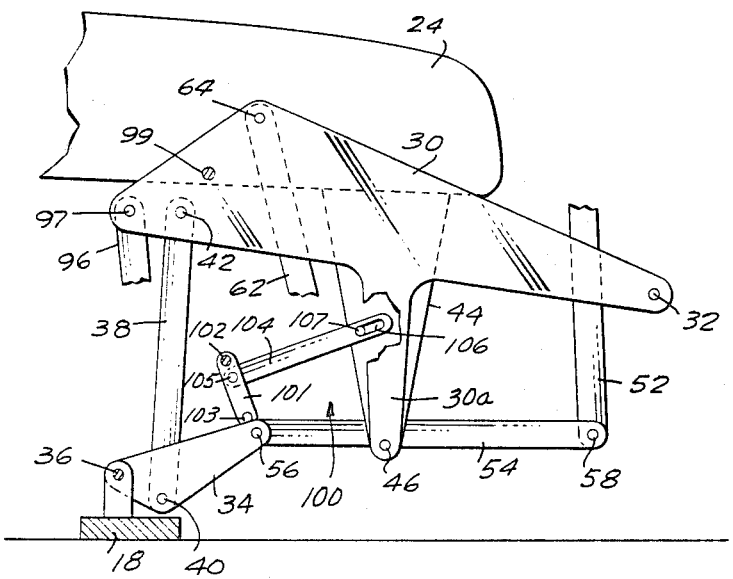
FIG. 4 is an enlarged fragmentary side elevational view corresponding to the complete showing of FIG. 1, with parts broken away for clarity, showing the sequencing arrangement and its relationship to the chair linkage in the upright sitting position.
Figure 5:
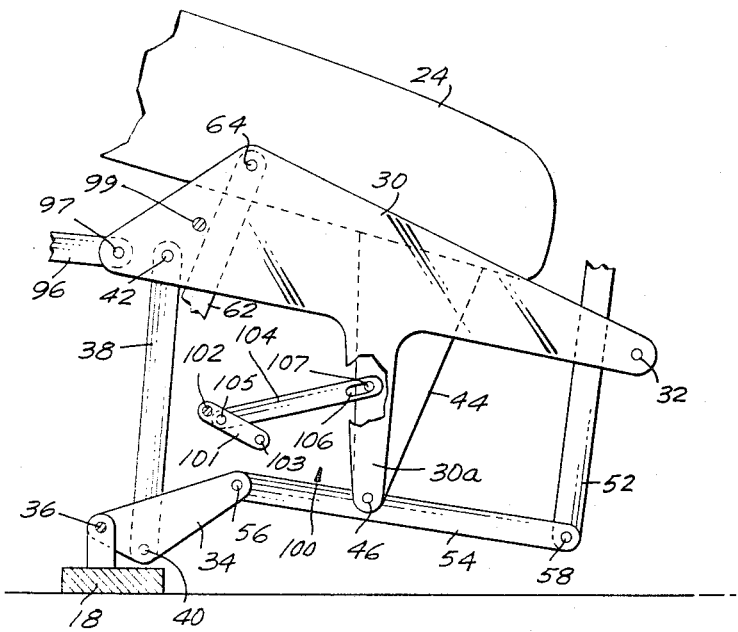
FIG. 5 is a view similar to FIG. 4, showing the sequencing arrangement and the chair linkage in the intermediate, tilted sitting position corresponding to the complete showing of FIG. 2.

In this illustrative embodiment, a sequencing arrangement, generally designated by the reference numeral 100 and shown on an enlarged scale in FIGS. 4 and 5, is engaged with a link of the second movement linkage and coupled to the body-supporting means for blocking movement of the second movement linkage at the start of the first movement phase. The blocking action of the second movement linkage is accomplished with the chair in the upright sitting position; and after a slight time delay from the start of chair movement out of the upright sitting position of FIG. 1 and toward the intermediate, tilted sitting position of FIG. 2 during the first movement phase, the sequencing arrangement is moved out of blocking engagement with the second movement linkage such that the second movement phase is completed. The unblocked or disabled sequencing arrangement 100 does not interfere with the guiding action of the second movement linkage during the second movement phase, but during the reverse sequence of movements is returned to its blocking relation to the second movement linkage when the chair is restored to the upright sitting position of FIG. 1. Specifically, the sequencing arrangement 100 includes a mounting link 101 which has a pivotal mount 102 at its upper end on the support 12, and carries adjacent its lower end a blocking member 103 in the form of a pin which engages the link or plate 34 of the second movement linkage adjacent the pivotal connection 56. A delayed coupling means couples the mounting link 101 to the seat 24 for moving the blocking member or pin 103 out of engagement with the link 34 of the second movement linkage during the first movement phase and after a prescribed time delay. The delayed coupling means includes a coupling link 104 having a pivotal connection 105 at its forward end to the mounting link 101 at a point spaced below the pivotal mount 102. The rearward end of the coupling link 104 is formed with a lost motion slot 106 which engages a pin 107 fixed to the depending mounting plate 44 of the seat 24. The pin 107 is at the forward end of the slot 106 in the coupling link 104, and accordingly there will be a lost motion travel of the pin 107 rearwardly along the slot 106 as the seat 24 pivots about its pivotal mount 46 during the first movement phase before the coupling link 104 is effectively connected to the plate 44 of the seat 24. The length of the lost motion slot 106 is selected to establish a prescribed lost motion travel of the pin 107 relative to the coupling link 104 to thereby effectively delay the actuation of the mounting link 101. After the prescribed time delay, the rearwardly directed thrust imparted to the coupling link 104 is effective to turn the mounting link 101 about its pivotal mount 102 in the counterclockwise direction to swing a blocking member or pin 103 out of engagement with the second movement link from the blocked position illustrated in FIGS. 1 and 4 to the unblocked position illustrated in FIGS. 2 and 5, wherein the second movement linkage is free for operation. Of course, the second movement linkage does not come into operation until the end of the first movement phase, as established by contact of the link 62 with the stop 99. During the reverse sequence of operations, the chair may be restored from the fully reclined position illustrated in FIG. 3 to the intermediate, tilted sitting position of FIG. 2 with the sequencing arrangement 100 being effectively disabled; and thereafter the chair may be moved from the intermediate, tilted sitting position illustrated in FIG. 2 to the upright sitting position illustrated in FIG. 1 with the sequencing arrangement moving into blocking relation with the second movement linkage as the chair moves into the upright sitting position.

Referring now specifically to FIGS. 6 to 10 of the drawings, there is shown a still further embodiment of reclining chair for the purpose of demonstrating further features of the present invention. The chair, which is generally designated by the reference numeral 110, includes a support or frame 112 having opposite side walls 114, 116 interconnected by appropriate cross-braces 118.

Figure 6:
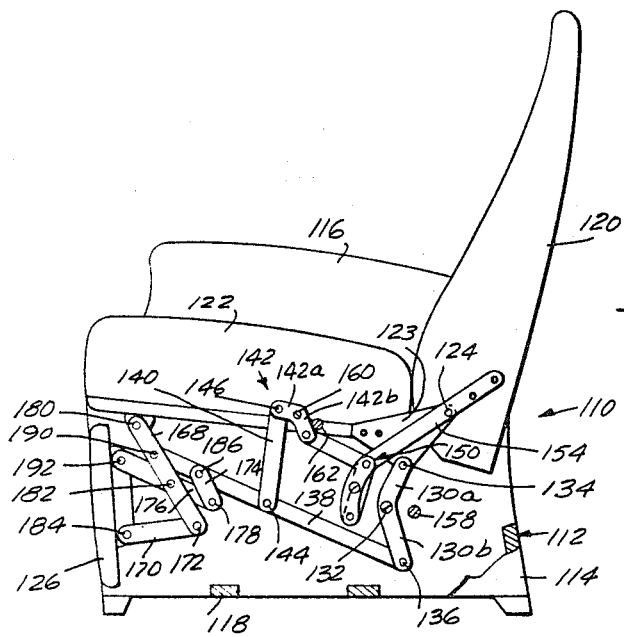
FIG. 6 is a side elevational view, with parts broken away and sectioned, showing a further embodiment of reclining chair of the double movement type in the upright sitting position which is adapted to receive a further sequencing arrangement in accordance with the present invention, as illustrated in detail in FIG. 9.
Figure 7:
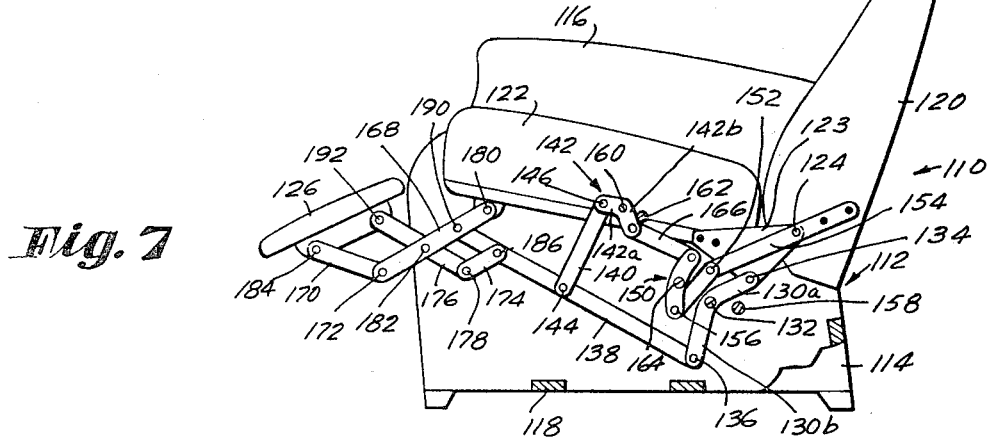
FIG. 7 is a side elevational view of the embodiment of reclining chair shown in FIG. 6, but illustrated in the intermediate, tilted sitting position.
Figure 8:
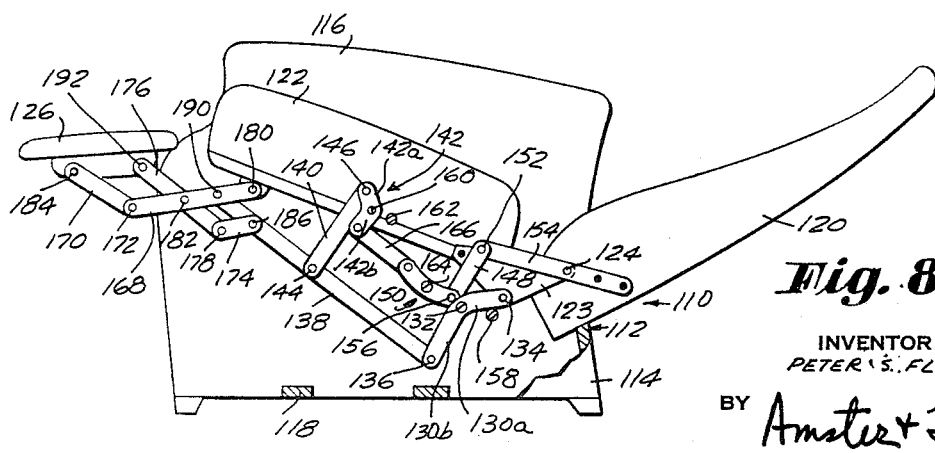
FIG. 8 is a side elevational view similar to FIG. 7 but showing the reclining chair in the fully reclined position.

Body-supporting means, including a back-rest 120 and a seat 122 are mounted on the support for reclining and inclining movement respectively for a first movement phase from the upright sitting position illustrated in FIG. 6 to the intermediate, tilted sitting position (the position illustrated in FIG. 7 being slightly in advance thereof) during which there is substantially no angular displacement between the seat and back-rest; and for a second movement phase from the intermediate, tilted sitting position through a series of reclining positions to a fully reclined position illustrated in FIG. 8. The seat 122, which is mounted as will subsequently be described, carries a rearwardly directed rigid hanger arm or bracket 123 and the back-rest 120 is mounted on such hanger arm for reclining movement about a back-rest pivot 124.

Disposed beneath the forward end of the seat 122 is a leg-rest 126 which is mounted for movement from the stored position illustrated in FIG. 6 to the elevated leg-supporting positions illustrated in FIGS. 7 and 8. As will be described, the leg-rest 126 is coordinated to the body-supporting means for movement into the elevated leg-supporting position in response to the first movement phase of the chair, with the leg-rest 126 remaining substantially in the elevated leg-supporting position as the chair moves from the intermediate, tilted sitting position of FIG. 7 to the fully reclined position of FIG. 8.

In this illustrative embodiment, the first movement linkage includes a double-arm lever 130 which is pivotally mounted on the support at a pivotal mount 132 intermediate its ends. The upwardly directed arm 130a of the double-arm lever 130 is coupled to the bracket 123 rigid with the seat 122 at a pivotal connection 134, while the arm 130b has a pivotal connection 136 to a forwardly and upwardly projecting connecting link 138 which is connected to the leg-rest mounting linkage, as will subsequently be described. The connecting link 138 is coupled by a guiding link 140 to a double-arm lever 142 which provides a stationary support during the first movement phase and is movable during the second movement phase, as may be appreciated by progressively inspecting FIGS. 6 and 7 and 8. Specifically, the guiding link 140 has a pivotal connection 144 at its lower end to the connecting link 138 and a pivotal connection 146 at its upper end to the arm 142a of the double-arm lever 142. Provision is made for coupling the back-rest to the second movement linkage by a back-rest link 148 which is coupled between the back-rest 120 and a further double-arm lever 150 which remains stationary during the first movement phase and is movable during the second movement phase. Specifically, the back-rest link 148 has a pivotal connection 152 at one end to a bracket or arm 154 rigid with the back-rest 120 and a pivotal connection 156 at its other end to the arm 150a of the double-arm lever 150. The connecting link 138, the guiding link 140, the link 130, and the extension to the seat of link 168 are effective to guide the back-rest 120 and the seat 122 relative to the support during the first movement phase to the intermediate, tilted sitting position of FIG. 7, with substantially no relative movement between the back-rest 120 and the seat 122 due to the action of the back-rest link 148.

Provision is made for blocking movement of the double-arm lever 130 relative to the support at the end of the first movement phase, which in this illustrative embodiment takes the form of a stop 158 positioned to abut the arm 130a of the double-arm lever 130 at the end of the first movement phase. Thus, at the end of the first movement phase, the pivotal connection 136 to the connecting link 138 effectively becomes a stationary pivotal mount for the connecting link 138 during the second movement phase.

The second movement phase linkage includes the double-arm lever 142 which has a pivotal mount 160 on the support intermediate its end. The arm 142b thereof bears at its upper side against the stop 162 which prevents turning movement of the arm 142b in the counterclockwise direction about the pivotal mount 160 of the lever 142 on the support. The double-arm lever 150 for the second movement linkage has a pivotal mount 164 intermediate its ends on the support, with the arm 150b thereof being connected to the arm 142b of the double-arm lever 142 by a connecting link 166. During the second movement phase the connecting link 138, the guiding link 140, the extension of the link 168 to the seat, the double-arm lever 150 and the back-rest link 148 are effective to achieve the desired coordinated movement of the back-rest 120 and the seat 122, as may be appreciated by progressively inspecting FIGS. 7 and 8.

In this illustrative embodiment, the leg-rest 126 is mounted for movement from the stored position beneath the seat by a leg-rest mounting linkage which includes a first pair of links 168, 170 having a pivotal interconnection 172 and a second pair of links 174, 176 having a pivotal interconnection 178. The link 168 of the first link pair has a pivotal mount 180 on the seat 122 and crosses over the link 176 of the second link pair and has a pivotal connection 182 thereto. The link 170 has a pivotal connection 184 to the leg rest 126. The link 174 of the second link pair has a pivotal connection 186 to the connecting link 138 at a point spaced from the forward end thereof. A pivotal connection 190 is provided at the forward end of the connecting link 138 to the link 168 of the first link pair intermediate the pivotal connections 180, 182. The link 176 of the second link pair has a pivotal connection 192 at its forward end to the leg-rest 126 at a point spaced from the pivotal connection 184. The leg-rest mounting linkage will be recognized as incorporating a suspended quadric linkage mounted on the connecting link 138 and having a pivotal connection 180 to the seat which is effective to elevate the leg-rest 126 as a forward thrust is imparted to the conecting link 138 incident to turning of the double-arm lever 130 during the first movement phase.

Figure 9:
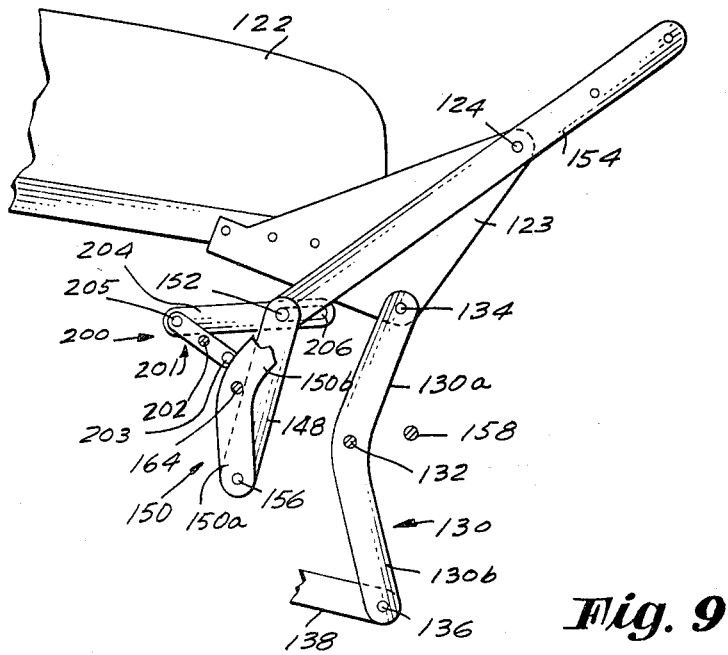
FIG. 9 is an enlarged fragmentary side elevational view with parts broken away and sectioned for clarity, showing a further sequencing arrangement in accordance with the present invention, as embodied in the chair illustrated in FIGS. 6 to 8 inclusive, with the sequencing arrangement and the linkage shown in the upright sitting position of the chair.
Figure 10:
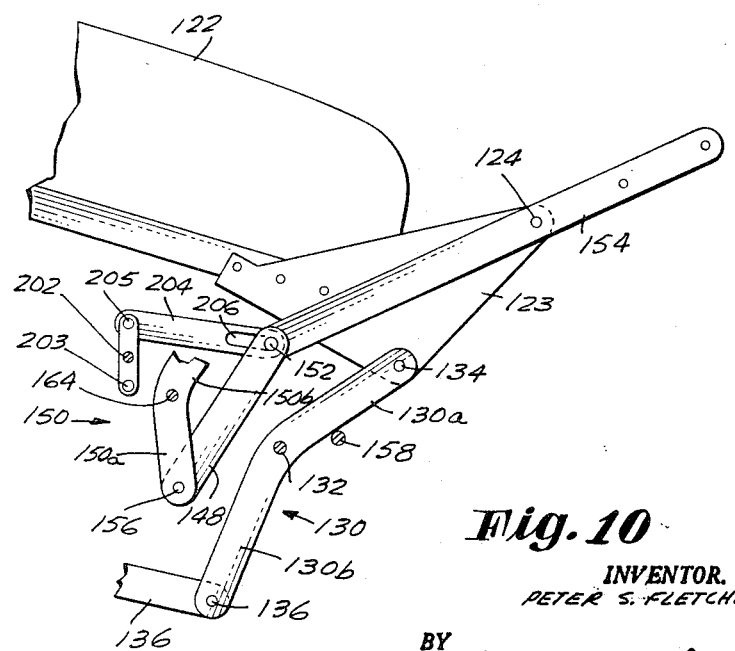
FIG. 10 is a view similar to FIG. 9 but showing the sequencing arrangement and the chair linkage in a position corresponding to the intermediate tilted sitting position of the chair.

In this illustrative embodiment, a sequencing arrangement, generally designated by the reference numeral 200 and illustrated only in the enlarged fragmentary showings of FIGS. 9 and 10 in the interests of clarity, is engaged with a link of the second movement phase and coupled to the body-supporting means 120, 122 for blocking movement of the second movement linkage at the start of the first movement phase. The blocking action of the second movement linkage is accomplished with the chair in the upright sitting position; and after a slight time delay from the start of chair movement out of the upright sitting position of FIGS. 6 and 9 and toward the intermediate, tilted sitting position of FIGS. 7 and 10 during the first movement phase, the sequencing arrangement is moved out of blocking engagement with the second movement linkage such that the second movement linkage is enabled to operate after the first movement phase is completed. The unblocked or disabled sequencing arrangement 200 does not interfere with the guiding action of the second movement linkage during the second movement phase, but during the reverse sequence of movements is returned to its blocking relation to the second movement linkage when the chair is restored to the upright sitting position of FIGS. 6 and 9. Specifically, the sequencing arrangement 200 includes a mounting lever 201 which has a pivotal mount 202 intermediate its ends on the support 112 and carries adjacent its lower end a blocking member 203 in the form of a pin which engages the arm 150b of lever 150 of the second movement linkage adjacent to and above the pivotal mount 164. A delayed coupling means couples the mounting link 201 to the back-rest 120 for moving the blocking member or pin 203 out of engagement with the lever 150 of the second movement linkage during the first movement phase and after a prescribed time delay. The delayed coupling means includes a coupling link 204 having a pivotal connection 205 at its forward end to the upper end or arm of the mounting lever 201. The rearward end of the coupling link 204 is formed with a lost motion slot 206 which engages the pivotal connection 152 between the back-rest link 148 and the arm 154 rigid with the back-rest. The pin 152 is at the forward end of the slot 206 in the coupling link 204 in the upright sitting position of the chair and accordingly there will be a lost motion travel of the pin 152 rearwardly along the slot 206 as the back-rest 120 pivots about its backrest pivot 124 during the first movement phase before the coupling link 204 is effectively connected to the arm 154 rigid with the backrest 120. The length of the lost motion slot 206 is selected to establish a prescribed lost motion travel of the pin 152 relative to the coupling link 204 to thereby effectively delay the actuation of the mounting lever 201. After the prescribed time delay, a rearwardly directed thrust imparted to the coupling link 204 which is effective to turn the mounting lever 201 about its pivotal mount 202 to swing the blocking member or pin 203 in the clockwise direction out of engagement with the second movement lever 150 from the blocked position illustrated in FIG. 9 to the unblocked position illustrated in FIG. 10 wherein the second movement linkage is free for operation. Of course, the second movement linkage does not come into operation until the end of the first movement phase, as established by contact of the arm 130a of lever 130 with the stop 158. During the reverse sequence of operations, the chair may be restored from the fully reclined position illustrated in FIG. 8 to the intermediate, tilted sitting position, with the sequencing arrangement 200 being effectively disabled; and thereafter the chair may be moved from the intermediate, tilted sitting position to the upright sitting position illustrated in FIG. 6, with the sequencing arrangement moving into blocking relation with the second movement linkage as the chair moves into such upright sitting position.

Referring now specifically to FIGS. 11 to 15 of the drawings, there is shown a still further embodiment of reclining chair demonstrating still further features of the present invention, generally designated by the reference numeral 210, which includes a support or frame 212 having opposite side walls 214 interconnected by suitable cross braces 216 and supported on depending legs 218.

Body-supporting means 220 including a back-rest 222 and a seat 224 are mounted on the support 212 for reclining and inclining movement respectively for a first movement phase from an upright sitting position illustrated in FIG. 11 to an intermediate, tilted sitting position illustrated in FIG. 12 and for a second movement phase from the intermediate, tilted sitting position illustrated in FIG. 12 through a series of reclining positions to a fully reclined position illustrated in FIG. 13.

Disposed beneath the forward end of the seat 224 is a leg-rest 226 which is mounted for movement from a stored or retracted position illustrated in FIG. 11 to elevated leg-supporting positions illustrated in FIGS. 12 and 13. As will be described, the leg-rest 226 is coordinated to the body-supporting means 220 for movement into an elevated leg-supporting position in response to the movement of the body-supporting means to the first movement phase and into the intermediate, tilted sitting position of FIG. 12, with the leg-rest moving into further leg-supporting positions as the chair moves through the various reclining positions to the fully reclined position of FIG. 13.

The linkage mechanism or chair hardware which is provided at each side of the chair includes a mounting bracket or fixture 222a fixed to the seat, and a still further mounting bracket or fixture 226a fixed to the leg-rest 226. The mounting bracket 224a includes a rearwardly directed rigid hanger arm portion which is connected to the back-rest 222 and its bracket 222a at a seat pivot 230. A first movement linkage is provided which includes a front guiding link 232 having a pivotal connection 234 to the seat 224 at the forward end of the bracket 224a, the portion of the seat 224 intermediate the pivotal connections 234, 230, a holding or intermediate link 236, a rear guiding link 238 having a pivotal connection 240 to the back-rest 222 at a point spaced rearwardly of the pivotal connection 230, and the portion of the back-rest intermediate the pivotal connections 230, 240, with relatively stationary links being provided intermediate the respective pivotal mounts of the front, intermediate and rear guiding links 232, 236, 238 respectively. Specifically, there is provided a mounting link 242 which extends lengthwise of the chair frame and rests against the cross brace 216 serving as the stop throughout the first movement phase, as may be appreciated by progressively inspecting FIGS. 11 and 12. The front guiding link 232 which constitutes the upwardly projecting arm of a double-arm lever has a pivotal mount 244 intermediate its ends on the mounting link 242 at a point spaced rearwardly from the forward end thereof. The holding link 236 has a pivotal mount 246 at its lower end at the rearward end of the mounting link 242, while the rear guiding link 238 has a pivotal mount 248 directly on the support 212. The mounting link 242 is pivotally and movably mounted on the support by a second movement link 250 which has a pivotal mount 252 at its rearward end on the support and a pivotal connection 254 at its forward end to the mounting link 242 intermediate the pivotal connections 244, 246.

The leg-rest 226 is mounted for movement from the retracted position of FIG. 11 to the elevated leg-supporting positions illustrated in FIGS. 12 and 13 by a leg-rest mounting linkage, generally designated by the reference numeral 270, which includes a first pair of links 272, 274 having a pivotal interconnection 276 at their adjacent ends, a second pair of links 278, 280 having a pivotal connection 282 at their adjacent ends, and a third pair of links 284, 286 having a pivotal connection 288 at their adjacent ends. The link 272 is seen to be a depending extension rigid of the front guiding link 232, with the links 232, 272 constituting a double-arm lever. The link 274 crosses over the link 278 and has a pivotal connection 290 thereto. The forward end of the link 274 of the first link pair has a pivotal connection 292 to the link 284 of the third link pair. The link 284 in turn crosses over the link 280 of the second link pair and has a pivotal connection 294 thereto at the cross over point, with the link 286 of the third link pair having a pivotal connection 296 at its forward end to the lower end of the leg-rest 226. The link 278 of the second link pair has a pivotal connection 298 at its upper end to the forward end of the mounting link 242, while the link 280 of the second link pair has a pivotal connection 300 at its forward end to the upper ends of the leg-rest 226. The leg-rest mounting linkage 270 will be recognized as being of the lazy tong type wherein a turning movement of the link 272 in a direction to move the pivotal connection 276 toward the pivotal connection 298 is effective to extend such lazy tong linkage to move the leg-rest 226 to the extended and elevated leg-supporting positions illustrated in FIGS. 2 and 3. Specifically, during the first movement phase the front guiding link 232 which turns in the clockwise direction about the relatively stationary pivotal mount 244 in response to the rearward movement of the seat 224 serves as a driver to the leg-rest mounting linkage 270 which causes a corresponding clockwise turning movement of the link 272 about the relatively stationary pivotal mount 244.

In accordance with this illustrative embodiment, the mounting link 242 of the second movement linkage is releasably locked to the support in the upright sitting position of the chair to block the second movement linkage against movement at the start of the first movement phase. Specifically, the rearward portion of the mounting link 242 is releasably locked to the support 212 by the provision of an integral blocking extension 302 of the holding or middle guiding link 236. The extension 302 is formed with a locking notch 304 which engages a locking pin 306 fixed to the support 212 when the chair is in the upright siting position shown in FIG. 11. Further, the forward portion of the mounting link 242 is releasably locked to the support 212 by the provision of a locking finger or angle bracket 308 which is carried on the cross brace 216 and is engaged in a locking notch 310 in the link 272 when the chair is in the upright sitting position illustrated in FIG. 11. As the chair moves out of the upright sitting position at the start of the first movement phase, it will be appreciated that the respecive locking or holding means which secure the mounting link 242 to the support are released to enable operation of the second movement linkage after the first movement phase is completed. Specifically, the blocking extension 302 turns in the clockwise direction about the pivotal connection 246 forwardly and out of engagement with the locking pin 306 and simultaneously the link 272 swings forwardly to move the locking notch 310 out of engagement with the locking finger 308.

A further releasable locking or holding means is carried on a link of the first movement linkage and is arranged to lock the first movement linkage against further movement in response to the movement of the second movement linkage after the chair arrives at the intermediate, tilted sitting position of FIG. 12. Specifically, and as seen best in FIGS. 14 and 15 a blocking member 312 formed with a locking notch 314 is pivotally mounted on the rear guiding link 238 of the first movement linkage at a pivotal mount 316. A locking pin 318 is fixed to the support in position to be engaged within the locking notch 314 on the blocking member 312 at the end of the first movement phase. A spring 320 is fixed between the blocking member 312 and the bracket 222a on the back-rest 222 which biases the blocking member 312 in a direction such that the locking notch 314 may embrace the locking pin 318. During the first movement phase, the bracket 222a on the back-rest 222 maintains the blocking member 312 out of contact with the locking pin against the tension of spring 320. However, when the bracket 222a turns in the clockwise direction about the pivotal connection 240 during the second movement phase, the spring tensioned blocking member is freed to engage the locking pin 318. It will, of course, be appreciated that during the reverse sequence of operations in the second movement phase, and in response to counterclockwise movement of the bracket 222a about the pivotal connection 240, the blocking member 312 will be released from the locking pin 318 on the support such that the first movement linkage may operate in the required sequence to restore the chair to the upright sitting position illustrated in FIG. 11. As the chair moves through the first movement phase into the upright sitting position, the respective releasable blocking or holding means for the mounting link 242 of the second movement linkage are engaged to effectively disable the second movement linkage for the next sequence of operations of the chair.

From the foregoing it will be appreciated that there has been provided in accordance with the several illustrative embodiments of the present invention means for locking the second movement linkage against movement at the start of the first movement phase, with a delayed release of the second movement linkage to enable its guiding of the chair during the second movement phase and after completion of the first movement phase. The illustrative arrangements may be applied to a wide variety of multiple movement chairs; and it is entirely within the contemplation of the invention for the illustrative blocking arrangements to be employed in chairs incorporating different types of main guiding linkages.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. In a reclining chair of the multiple movement type comprising a support, body-supporting means including a seat and back-rest, and mounting means for said body-supporting means including first and second movement linkages operated in the order named to move said body-supporting means from an upright sitting position through a first movement phase to an intermediate, tilted sitting position and through a second movement phase to a fully reclined position the improvement comprising blocking means for blocking said second movement linkage against movement at the start of said first movement phase, and actuating means operable during said first movement phase for disengaging said blocking means, said actuating means moving said blocking means to a disengaged position prior to said body-supporting means reaching said intermediate tilted sitting position, said blocking means being in a disengaged position in said intermediate, tilted sitting position and during said second movement phase.

2. In a reclining chair of the multiple movement type comprising a support, body-supporting means including a seat and back-rest, and mounting means for said body-supporting means including first and second movement linkages operated in the order named to establish first and second movement phases for said chair with said body-supporting means having a defined intermediate, tilted sitting position therebetween, the improvement comprising blocking means engaging said second movement linkage and blocking the same against movement at the start of said first movement phase, and actuating means including a lost motion connection operable during said first movement phase for moving said blocking means out of engagement with said second movement linkage after a prescribed time delay, said actuating means moving said blocking means to a disengaged position prior to said body-supporting means reaching said intermediate tilted sitting position, said blocking means being in a disengaged position in said intermediate, tilted sitting position and during said second movement phase.

3. In a reclining chair of the multiple movement type comprising a support, body-supporting means including a seat and back-rest, and mounting means for said body-supporting means including first and second movement linkages operated in the order named to establish first and second movement phases for said chair, the improvement comprising a blocking member engaging a link of said second movement linkage and blocking the same against movement at the start of said first movement phase, means pivotally mounting said blocking member on said support for movement out of engagement with said link of said second movement linkage, and link means including a lost motion connection to said first movement linkage and operable during said first movement phase for moving said blocking member out of engagement with said second movement linkage after a prescribed time delay.

4. In a reclining chair of the multiple movement type comprising a support, body-supporting means including a seat and back-rest, and mounting means for said body-supporting means including first and second movement linkages operated in the order named to establish first and second movement phases for said chair, the improvement comprising a blocking member engaging a link of said second movement linkage and blocking the same against movement at the start of said first movement phase, means pivotally mounting said blocking member on said support for movement out of engagement with said link of said second movement linkage, and a link including a pin and slot connection to said first movement linkage serving as a lost motion means and operable during said first movement phase for moving said blocking member out of engagement with said second movement linkage after a prescribed time delay.

5. In a reclining chair of the multiple movement type comprising a support, body-supporting means including a seat and back-rest, and mounting means for said body-supporting means including first and second movement linkages operated in the order named to establish first and second movement phases for said chair, the improvement comprising a blocking member engaging a link of said second movement linkage and blocking the same against movement at the start of said first movement phase, a link carrying said blocking member and pivotally mounted on said support for moving said blocking member out of engagement with said link of said second movement linkage, and a coupling having a lost motion connection to said first movement linkage and operable during said first movement phase for moving said blocking member out of engagement with said second movement linkage after a prescribed time delay.

6. In a reclining chair, a support, body-supporting means including a seat and back rest adapted to be mounted for inclining and reclining movement respectively from an upright sitting position through first and second movement phases to a fully reclined position, a carrier link pivotally mounted on said support and movable relative to said support during said second movement phase, means pivotally mounting said back-rest on said seat for reclining movement, a second movement linkage including said carrier link and a back-rest link pivotally connected to said back-rest, blocking means engaging a link of said second movement linkage in said upright sitting position, and coupling means coupling said blocking means to said seat for moving said blocking means out of engagement with said link of said second movement linkage during said first movement phase.

7. In a reclining chair, a support, body-supporting means including a seat and back-rest adapted to be mounted for including and reclining movement respectively from an upright-sitting position through first and second movement phases to a fully reclined position, a carrier link pivotally mounted on said support and movable relative to said support during said second movement phase, means pivotally mounting said seat on said carrier link for inclining movement, means pivotally mounting said back-rest on said seat for reclining movement, a second movement linkage including said carrier link and a back-rest link pivotally connected to said back-rest, blocking means engaging a link of said second movement linkage in said upright sitting position, and delayed coupling means coupling said blocking means to said seat for moving said blocking means out of engagement with said link of said second movement linkage during said first movement phase and after a prescribed time delay.

8. In a reclining chair, a support, body-supporting means including a seat and back-rest adapted to be mounted for inclining and reclining movement respectively from an upright sitting position through first and second movement phases to a fully reclined position, a carrier link pivotally mounted on said support and movable relative to said support during said second movement phase, means pivotally mounting said seat on said carrier link for inclining movement, means pivotally mounting said back-rest on said seat for reclining movement, a second movement linkage including said carrier link and a back-rest link pivotally connected to said back-rest, a blocking member engaging a link of said second movement linkage in said upright sitting position, a mounting link carrying said blocking member and pivotally mounted on said support, and delayed coupling means coupling said mounting link to said seat for moving said blocking member out of engagement with said link of said second movement linkage during said first movement phase and after a prescribed time delay.

9. In a reclining chair of the multiple movement type comprising a support, body-supporting means including a seat and back-rest, and mounting means for said body-supporting means including first and second movement linkages operated in the order named to establish first and second movement phases for said chair, the improvement comprising a blocking member engaging a link of said second movement linkage and blocking the same against movement at the start of said first movement phase, and link means including a lost motion connection to said first movement linkage and operable during said first movement phase for moving said blocking member out of engagement with said second movement linkage after a prescribed time delay said link means moving said blocking member into a disengaged position prior to completion of said first movement phase.

References Cited

UNITED STATES PATENTS

| | | | |
|---|---|---|---|
| 2,615,497 | 10/1952 | Luckhardt | 297—84 |
| 2,918,109 | 12/1959 | Schliephack | 297—87 |
| 2,918,113 | 12/1959 | Lorenz | 297—89 |
| 2,940,509 | 6/1960 | Fletcher | 297—329 |
| 2,948,331 | 8/1960 | Schliephacke | 297—84 |
| 3,014,758 | 12/1961 | Schliephacke | 297—89 |
| 3,087,754 | 4/1963 | Fletcher | 297—89 |
| 3,043,621 | 7/1962 | Fletcher | 297—85 |

FRANCIS K. ZUGEL, *Primary Examiner.*